United States Patent
Mezic et al.

(10) Patent No.: US 9,563,182 B2
(45) Date of Patent: Feb. 7, 2017

(54) BUILDING ANALYSIS SYSTEMS AND METHODS

(71) Applicant: Ecorithm, Inc., Goleta, CA (US)

(72) Inventors: Igor Mezic, Goleta, CA (US); Christopher Tagge, San Carlos, CA (US)

(73) Assignee: Ecorithm, Inc., Goleta, CA (US)

( * ) Notice: Subject to any disclaimer, the term of this patent is extended or adjusted under 35 U.S.C. 154(b) by 653 days.

(21) Appl. No.: 13/758,844

(22) Filed: Feb. 4, 2013

(65) Prior Publication Data

US 2013/0204402 A1    Aug. 8, 2013

Related U.S. Application Data

(60) Provisional application No. 61/595,631, filed on Feb. 6, 2012.

(51) Int. Cl.
   *G05B 13/02*    (2006.01)
   *G05B 15/02*    (2006.01)

(52) U.S. Cl.
   CPC ............ *G05B 13/02* (2013.01); *G05B 15/02* (2013.01); *G05B 2219/2642* (2013.01)

(58) Field of Classification Search
   None
   See application file for complete search history.

(56) References Cited

U.S. PATENT DOCUMENTS

| 8,165,891 B2 * | 4/2012 | Roberts | G06Q 10/06393 705/1.1 |
| 2004/0194506 A1 | 10/2004 | Ueda et al. | |
| 2007/0219645 A1 | 9/2007 | Thomas et al. | |
| 2008/0234935 A1 | 9/2008 | Wolf et al. | |
| 2008/0262898 A1 * | 10/2008 | Tonchev | G06Q 10/0639 705/7.38 |
| 2010/0283606 A1 | 11/2010 | Tsypin et al. | |
| 2010/0286937 A1 | 11/2010 | Hedley et al. | |
| 2012/0143516 A1 | 6/2012 | Mezic et al. | |

OTHER PUBLICATIONS

Turner et al. Energy performance of LEED for new construction buildings. Vancouver, WA: New Buildings Institute, 2008.*

(Continued)

*Primary Examiner* — Ryan Jarrett
(74) *Attorney, Agent, or Firm* — Knobbe, Martens, Olson & Bear, LLP

(57) ABSTRACT

Certain embodiments relate to systems and methods for monitoring and improving the efficiency by which systems maintain building environments. A building management system may analyze values observed by sensors and other devices and determine whether the observed values fall within a range. If the observed values do not fall within the range and the building's control system has not taken appropriate action to ensure that the observed values do fall within the range, the building may generate a floor plan specifying where the failure occurred. A building ranking system may rank a plurality of buildings based upon their relative efficiency. The building ranking system may determine each building's efficiency based on a set of parameters related to the building's energy usage that are normalized for weather, occupancy, and other external parameters.

8 Claims, 7 Drawing Sheets

(56) References Cited

OTHER PUBLICATIONS

Chung, William, Y. V. Hui, and Y. Miu Lam. "Benchmarking the energy efficiency of commercial buildings." Applied Energy 83.1 (2006): 1-14.*
International Search Report and Written Opinion, PCT Application No. PCT/US2013/024794, mailed Jun. 5, 2013.
International Search Report and Written Opinion received in International Patent Application No. PCT/US2013/024794, mailed Jun. 5, 2013, 14 pages.

* cited by examiner

BUILDING ANALYSIS SYSTEMS AND METHODS

CROSS-REFERENCE TO RELATED APPLICATIONS

This application claims priority under 35 U.S.C. §119(e) to U.S. Provisional Patent Application No. 61/595,631, entitled "BUILDING ANALYSIS SYSTEMS AND METHODS" and filed on Feb. 6, 2012, the entire disclosure of which is hereby incorporated by reference.

TECHNICAL FIELD

The systems and methods disclosed herein relate generally to computer systems and processes that use sensor data for monitoring and maintaining building environments.

BACKGROUND

There exists an increasing need for more efficient monitoring of building environments for the purposes of improving the efficiency by which systems maintain atmospheric conditions. Certain of the disclosed embodiments relate generally to analyzing and decomposing building sensor information into a more manageable form to subsequently determine behavioral properties of a real or synthetic building. Particularly, the embodiments provide certain additional features and improvements to systems such as those found in U.S. Provisional Patent Application No. 61/371,432, filed on Aug. 6, 2010, entitled "SYSTEMS AND METHOD FOR ENERGY EFFICIENT BUILDING DESIGN AND MANAGEMENT" and U.S. patent application Ser. No. 13/198,387 filed on Aug. 4, 2011, entitled "SYSTEMS AND METHODS FOR ANALYZING BUILDING OPERATIONS SENSOR DATA" and in PCT Application No. PCT/US2011/46620 filed on Aug. 4, 2011 entitled "SYSTEMS AND METHODS FOR ANALYZING BUILDING OPERATIONS SENSOR DATA." The disclosures of all three of these applications are hereby incorporated by reference herein in their entities for all purposes.

SUMMARY OF THE DISCLOSURE

As energy costs rise, improving the efficiency by which systems maintain atmospheric conditions of a building is of paramount importance. Sensors and other equipment can be used to collect and aggregate data related to a building's energy usage. However, especially for large buildings, the amount of data that can be collected may be enormous. For a building manager, parsing through the data to identify efficient and inefficient areas of energy usage may prove to be difficult. Thus, certain embodiments described herein relate to automated systems and methods for monitoring and improving the efficiency by which systems maintain building environments. For example, a building management system may analyze values observed by sensors and other equipment and determine whether the observed values fall within a range. If the observed values do not fall within the range and the building's control system has not taken appropriate action to ensure that the observed values do fall within the range, the building management system may generate a floor plan to graphically notify the building manager of this failure and where the failure occurred. As another example, a building ranking system may rank a plurality of buildings based upon their relative efficiency. The building ranking system may determine each building's efficiency based on a set of parameters related to the building's energy usage that are normalized for weather, occupancy, and/or other external parameters.

One aspect of the disclosure provides a method, implemented on at least one computer device, for determining errors relative to control logic of a building management system associated with a building. The method comprises determining a range of an output based on the control logic. The method further comprises detecting a traversal of sensor data across a boundary of the range. The method further comprises determining, in response to detecting the traversal, whether a consequent action specified by the control logic has occurred. The method further comprises generating, in response to determining that the consequent action has not occurred, a floor plan for display to a user. The floor plan may comprise an indicator specifying one or more locations in the building of one or more devices that obtained the sensor data.

Another aspect of the disclosure provides a system for determining errors relative to a control logic of a building management system associated with a building. The system comprises a processor configured to determine a range of an output based on the control logic. The system further comprises a comparator module configured to detect a traversal of sensor data across a boundary of the range. The system further comprises an events module configured to determine whether a consequent action specified by the control logic has occurred. The events module may determine whether the consequent action occurred in response to the comparator module detecting the traversal. The system further comprises a display module configured to generate a floor plan for display to a user. The floor plan may be configured to include an indicator specifying one or more locations in the building of one or more devices associated with the sensor data. The display module may generate the floor plan in response to the events module determining that the consequent action has not occurred.

Another aspect of the disclosure provides a method, implemented on at least one computer device, for assessing the relative efficiency of a plurality of buildings. The method comprises receiving a first plurality of data collected from a plurality of buildings. The first plurality of data may comprise energy utilization and energy supply data. The method further comprises normalizing the first plurality of data based on a second plurality of data. The second plurality of data may comprise at least one of weather data, occupancy data, climate data, operational protocol data, utility contract data, budget data, a legal designation, or utility cost data. The method further comprises generating an index of energy efficiency based on the normalized first plurality of data. The method further comprises generating a ranking of the plurality of buildings for display to a user based on the index.

Another aspect of the disclosure provides a system for assessing the relative efficiency of a plurality of buildings. The system comprises an I/O module configured to receive a first plurality of data collected from a plurality of buildings. The first plurality of data may comprise energy utilization and energy supply data. The system further comprises a processor configured to normalize the first plurality of data based upon a second plurality of data. The second plurality of data may comprise at least one of weather data, occupancy data, climate data, operational protocol data, utility contract data, budget data, a legal designation, or utility cost data. The system further comprises an index generator module configured to generate an index of energy efficiency based on the normalized first plurality of data. The system further comprises a display module configured to generate a ranking of the plurality of buildings for display to a user based upon the index.

Another aspect of the disclosure provides a non-transitory computer storage having stored thereon executable program code that directs a computing system comprising one or more computing devices to implement a process that comprises determining a range of an output based on control logic of a building management system associated with a building. The process further comprises detecting a traversal of sensor data across a boundary of the range. The process further comprises determining, in response to detecting the traversal, whether a consequent action specified by the control logic has occurred. The process further comprises generating, in response to determining that the consequent action has not occurred, a floor plan of the building for display to a user. The floor plan may comprise an indicator specifying one or more locations in the building of one or more devices that obtained the sensor data.

DETAILED DESCRIPTION OF SPECIFIC EMBODIMENTS

Automated Building System Diagnostics

Figure 1:
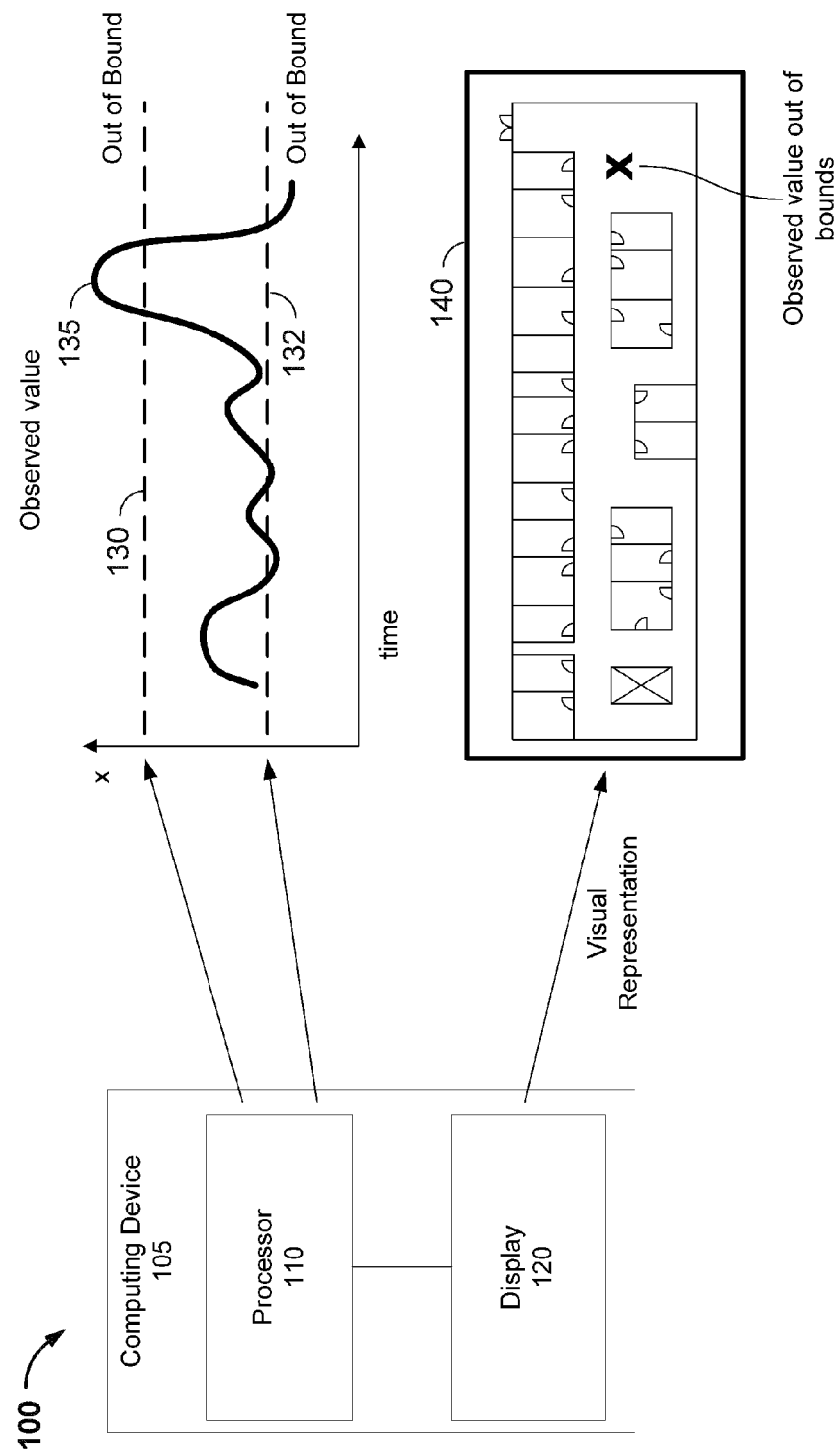
FIG. 1 illustrates an exemplary high-level systems diagram of a system with improved monitoring of building sensors.

FIG. 1 illustrates an exemplary high-level systems diagram of a building management system 100 with improved monitoring of building sensors. The building management system 100 may include a computing device 105, such as a server or a workstation, that implements a method for automated building system diagnostics. Although FIG. 1 depicts a single computing device 105, the functions described herein may be performed or distributed across multiple networked computing devices, including devices that are geographically distributed and/or are allocated dynamically from a pool of cloud computing resources. Some or all of the computing devices may be remote from the monitored building or buildings. For example, the computing device 105 is implemented by one more virtual machines in a hosted computing environment. The hosted computing environment may include one or more rapidly provisioned and released computing resources (e.g., dynamically-allocated computing resources), which computing resources may include computing, networking and/or storage devices.

In an embodiment, the computing device 105 may monitor the operations of a building. For example, the computing device 105 may monitor equipment located in the building, the comfort level within the building, and/or the energy usage and efficiency of the building. The computing device 105 may include a processor 110, a display 120, a memory (not shown), a comparator module (not shown), an events module (not shown), and/or a user interface (not shown). The processor 110 may execute operations or cause other devices to execute operations based on control logic mapped to the observed operations of the building. Particularly, FIG. 1 represents this mapping by arrows from the processor 110 to each of the threshold lines 130 and 132. In an embodiment, the threshold line 130 and/or 132 may be determined or generated by the processor 110. The control logic may include any prescribed set of rules or algorithms that allow for the control of building operations. For example, the control logic may comprise logic to turn on or off systems and actuators based on sensed values. Sensed values may include physical variables (e.g., temperature), software variables (e.g., setpoints), and/or building codes (e.g., indoor air quality levels that prescribe the minimum outdoor air delivery rate to the building). As an example, a temperature sensor may be used by the building management system 100 implementing the control logic to determine if the temperature falls within a range. As another example, an air-side economizer may be used by the building management system 100 implementing the control logic to mix an appropriate amount of outside air with recirculated indoor air such that the minimum outside air delivery rate is met. For simplicity, the systems and methods disclosed herein are described with respect to sensed physical variables (e.g., temperature). However, it should be apparent to one skilled in the art that the systems and methods disclosed herein may be implemented using any type of sensed value.

As illustrated in FIG. 1, the computing device 105 (e.g., the comparator module) monitors a temperature 135 over a period of time. When the temperature 135 is outside the range (e.g., above the threshold line 130 or below the threshold line 132), the building management system 100 may be expected by a user, based upon the control logic, to activate an actuator such as air conditioner. In this example, the threshold lines 130 and 132 may indicate the thresholds for a activating the actuator in the control logic. The building management system 100 (e.g., the events module of the computing device 105) may identify when the action is not taken (e.g., the actuator is not activated) when the temperature 135 exceeds the threshold lines 130 or 132, or the building management software fails to send the actuator activation command at the appropriate time. The building management system 100 may then indicate this failure on a floor plan 140 generated by the display 120, as illustrated in FIG. 1. Failure to signal the actuator and failure to properly implement the control logic may each be examples of errors that could cause the observed value to exceed the threshold lines 130 or 132.

The building management system 100 anticipates a possible situation where the building operations are not precise and data from the sensors contains noise. In an embodiment, the building management system 100 may handle the noise using filtering techniques, such as an autoregressive-moving-average (ARMA) model, a Kalman filter, and/or the like. In another embodiment, the building management system 100 may handle the noise by treating measured values that are within a certain threshold value or percentage of a setpoint as being the setpoint. For example, if a setpoint as set at 80° F., the method may treat any temperature within 2% of 80° F. as being 80° F. The threshold values or percentages may be based on building control requirements. As an example, if a building manager is concerned more about comfort than energy efficiency, then the threshold value or percentage may be set higher than if the building manager was more concerned about energy efficiency than comfort.

To clarify, the building management system 100 may confirm that the system dynamics are within a set when the dynamics of operations follows a prescribed logic and outside the set if the dynamics of operations are not within the set when the dynamics of operations follows the prescribed logic. The location of a device that generates an output using an algorithm based on a physical observable (e.g., temperature) that is not in correspondence (e.g., out of bound) with the associated control logic may be indicated, with or without a text description, in a floor plan 140 presented to a user, as illustrated in FIG. 1. In addition or alternatively, the location of a device that generates an output using an algorithm based on a control setting observable (e.g., a temperature setpoint) that is not in correspondence (e.g., out of bound) with the associated control logic may be indicated, with or without a text description, in the floor plan 140. For example, an algorithm may output an average temperature in a zone over a prescribed period of time (e.g., a day, a week, a month, etc.). In addition or alternatively, the location of a device that generates an output using an algorithm based on a combination of a physical observable and a control setting observable that is not in correspondence (e.g., out of bound) with the associated control logic may be indicated, with or without a text description, in the floor plan 140. For example, an algorithm may output an average difference of a temperature in a zone and a setpoint temperature in that same zone over a prescribed period of time (e.g., a day, a week, a month, etc.). In addition or alternatively, the location of a device that generates an output using an algorithm based on a Koopman mode amplitude that is outside of prescribed bounds may also be indicated in the floor plan 140 with or without a text description. Use of Koopman modes is discussed in Applications such as U.S. patent application Ser. No. 13/198,387.

Figure 2:
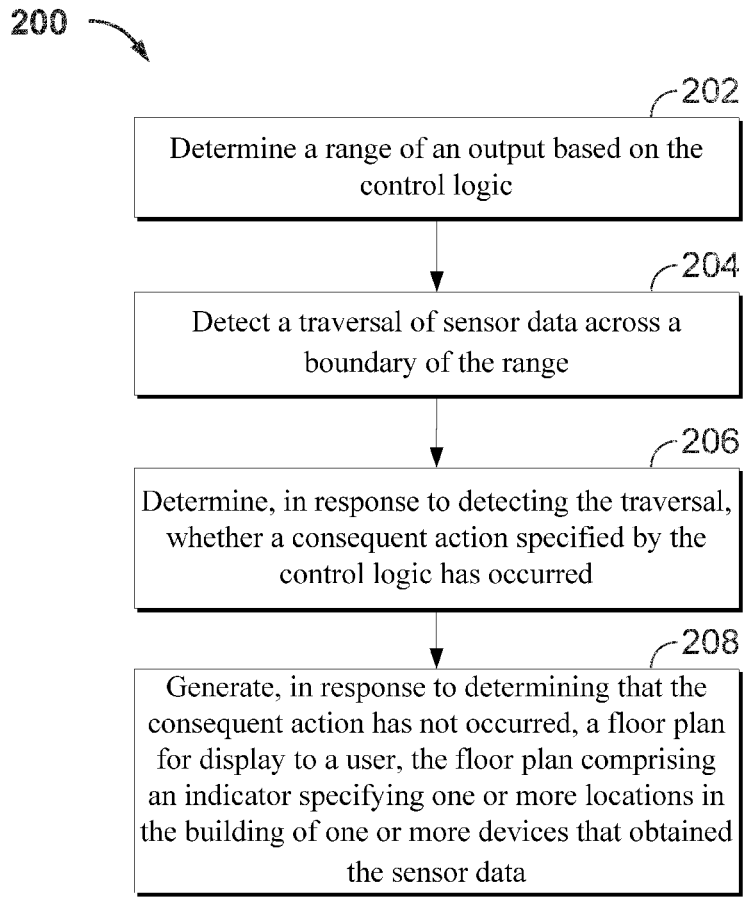
FIG. 2 illustrates a flowchart of a method for determining errors relative to a control logic of a building management system.

FIG. 2 illustrates a flowchart of a method 200 for determining errors relative to control logic of a building management system associated with a building. In an embodiment, the method 200 may be performed by the computing device 105 (e.g., under the control of program code that embodies the method), or by a system of distinct computing devices 105. At block 202, a range of an output is determined based on the control logic. At block 204, a traversal of sensor data across a boundary of the range is detected. In an embodiment, the sensor data is a temperature value or a humidity value. At block 206, in response to detecting the traversal, whether a consequent action specified by the control logic has occurred is determined. At block 208, in response to determining that the consequent action has not occurred, a floor plan is generated for display to a user. The floor plan may comprise an indicator specifying one or more locations in the building of one or more devices associated with the sensor data. In an embodiment, the one or more devices may be the devices that obtained the sensor data.

Assessing and Ranking Energy Efficiency of Buildings

Figure 3:
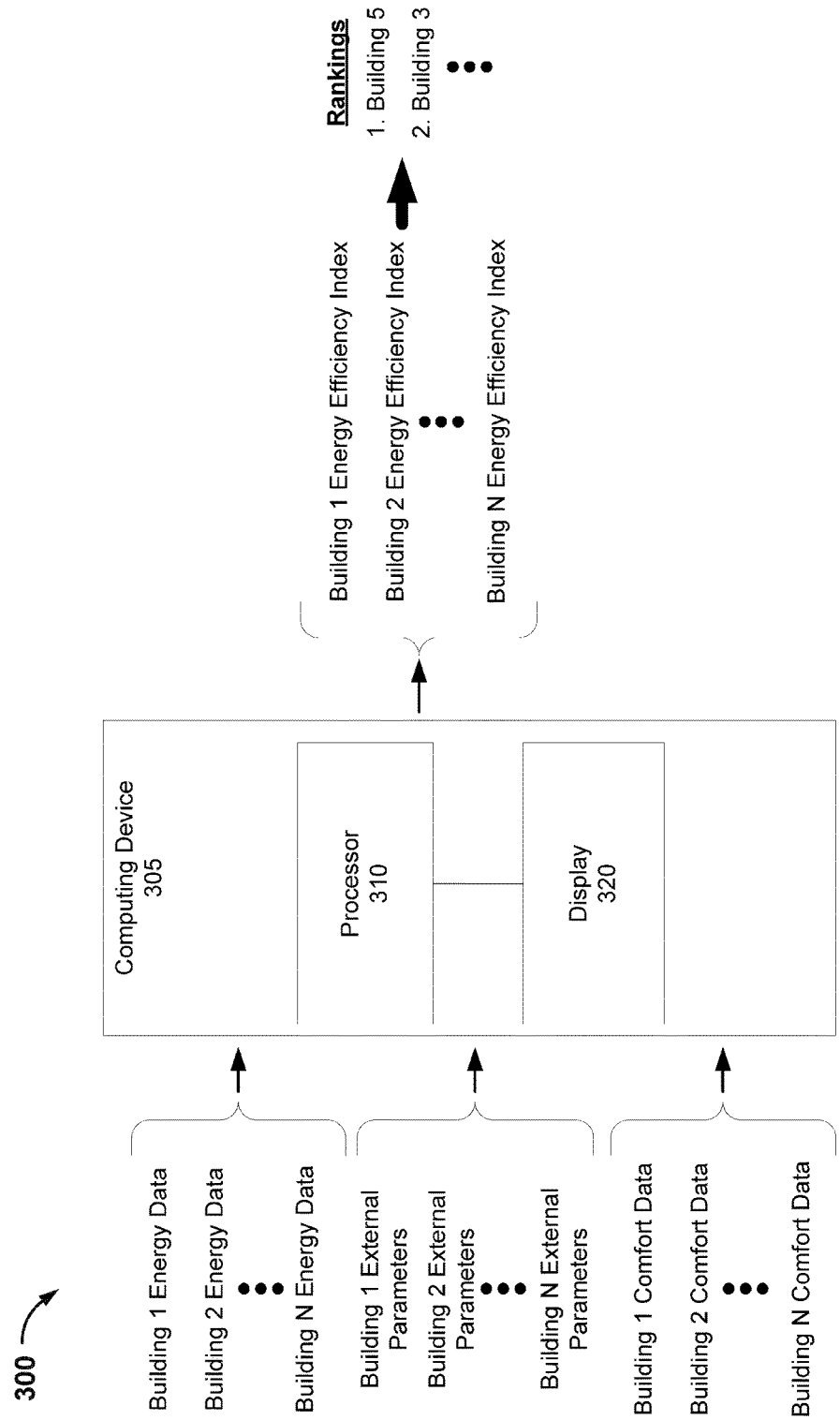
FIG. 3 illustrates an exemplary high-level systems diagram of a system which may rank the energy efficiency of a collection of buildings.

FIG. 3 illustrates an exemplary high-level systems diagram of a system 300 with improved monitoring of building sensors. The system 300 may include a computing device 305, such as a server or a workstation, that employs a method for ranking energy efficiency of a group of buildings. Although FIG. 3 depicts a single computing device 305, the functions described herein may be performed or distributed across multiple networked computing devices, including devices that are geographically distributed and/or are allocated dynamically from a pool of cloud computing resources. Some or all of the computing devices may be remote from the ranked building or buildings. For example, the computing device 305 is implemented by one more virtual machines in a hosted computing environment. The hosted computing environment may include one or more rapidly provisioned and released computing resources (e.g., dynamically-allocated computing resources), which computing resources may include computing, networking and/or storage devices.

The computing device 305 may include a processor 310, a display 320, a memory (not shown), an I/O module (not shown), an index generator module (not shown), and/or a user interface (not shown). The method may include the consideration of metrics taking into account climate, operational protocols, utility contracts, budget considerations laws (e.g., zoning laws), and utility costs. Given external parameters, such as weather (e.g., represented by degree-days, by average temperature values, by a time series of variables, such as wet-bulb temperature and humidity, etc.), occupancy (e.g., represented by the total number of occupants in a given minute, hour, day, etc., by the number of occupants in a zone at a given time, etc.), building type (e.g., office, classroom, lab, mixed-space, etc.), climate data, operational protocol data, utility contract data, budget data, a legal designation, or utility cost data, algorithms for the determination of energy utilization are developed by the processor 310.

The data collected inside each building, which may consist of energy utilization and energy supply data (e.g. sub-metered data) may be aggregated by the computing device 305 (e.g., the index generator module) and then normalized with weather and occupancy data (and/or other external parameters) to provide an index for energy efficiency. In an embodiment, energy utilization and/or energy supply data are represented as values, such as total plug load, zone plug load, total chiller energy, total boiler energy, zone air conditioning energy, and/or the like. The energy utilization and/or energy supply data values may be aggregated over a period of time, such as a day, a week, a month, a season, or the like. As an example, the energy utilization and/or energy supply data, after aggregation, may be represented as total plug load per day per day (or per week, per month, per season, etc.), zone plug load per day per day (or per week, per month, per season, etc.), total chiller energy per day per day (or per week, per month, per season, etc.), total boiler energy per day per day (or per week, per month, per season, etc.), zone air conditioning energy per day per day (or per week, per month, per season, etc.), and/or the like. The normalization facilitates a more accurate determination of the relative performance of one or more buildings, as it may account for factors uniquely affecting that building which are not common to the group of buildings as a whole. For campus buildings, campus-level models that incorporate features such as central chilled water loop may be used to optimize energy efficiency of the campus. For example, energy efficiency indices may be determined based on temperature (e.g., average temperature) and lighting data (e.g., energy bills). However, these raw data values may then be normalized using building specific information such as weather, occupancy, and/or other external parameters. The average of the values may sometimes be taken to facilitate an aggregation of the data. The higher the average temperature, the higher the energy bill may be.

The energy efficiency ranking of a building may be generated by the computing device 305 (e.g., the processor 310). In an embodiment, the energy efficiency ranking is based on the energy efficiency index generated for the building during current operation and the energy efficiency index generated for a building at optimal operation. For example, a model may be generated by the computing device based on a database of data collected inside the building and/or external parameters. The model may output an energy efficiency index, such as in a manner as described above. The model may also be optimized for operation (e.g., the model may be optimized to output an energy efficiency index for a building that is operating optimally). The difference between the energy efficiency index for a building that is operating optimally and the energy efficiency index for the building during current operation (e.g., which is based on the data in the database) may provide a basis for the energy efficiency ranking of the building. In some embodiments, the model includes an assessment of comfort in a building that is operating optimally and in the building during current operation when determining the energy efficiency ranking.

In another embodiment, the energy efficiency ranking is based on the energy efficiency index generated for a building during current operation and the energy efficiency index generated for a typical building of the same type as the building (e.g., an office building, a residential building, etc.) using a public database. For example, a public database (e.g., the Commercial Buildings Energy Consumption Survey (CBECS) database, etc.) may be used to obtain the building data and/or external parameters for a typical building of the same type as the building. As described above, a model may be generated by the computing device to output an energy efficiency index. The difference between the energy efficiency index for a typical building (e.g., which is based on the data in the public database) and the energy efficiency index for the building (e.g., which is based on data collected during current operation) may provide a basis for the energy efficiency ranking of the building.

In another embodiment, the energy efficiency ranking is based on the energy efficiency index generated for a building during current operation and the energy efficiency index generated for a typical building of the same type as the building (e.g., an office building, a residential building, etc.) using a proprietary database. For example, a proprietary database of comparison buildings (e.g., a typical building in the same geographical area as the building, in the same climate area as the building, etc.) may be used to obtain the building data and/or external parameters for a typical building of the same type as the building. As described above, a model may be generated by the computing device to output an energy efficiency index. The model may take into account external parameters as well as submeter variables, if available, to perform any normalization. The difference between the energy efficiency index for a typical building (e.g., which is based on the data in the proprietary database) and the energy efficiency index for the building (e.g., which is based on data collected during current operation) may provide a basis for the energy efficiency ranking of the building.

Figure 4A:
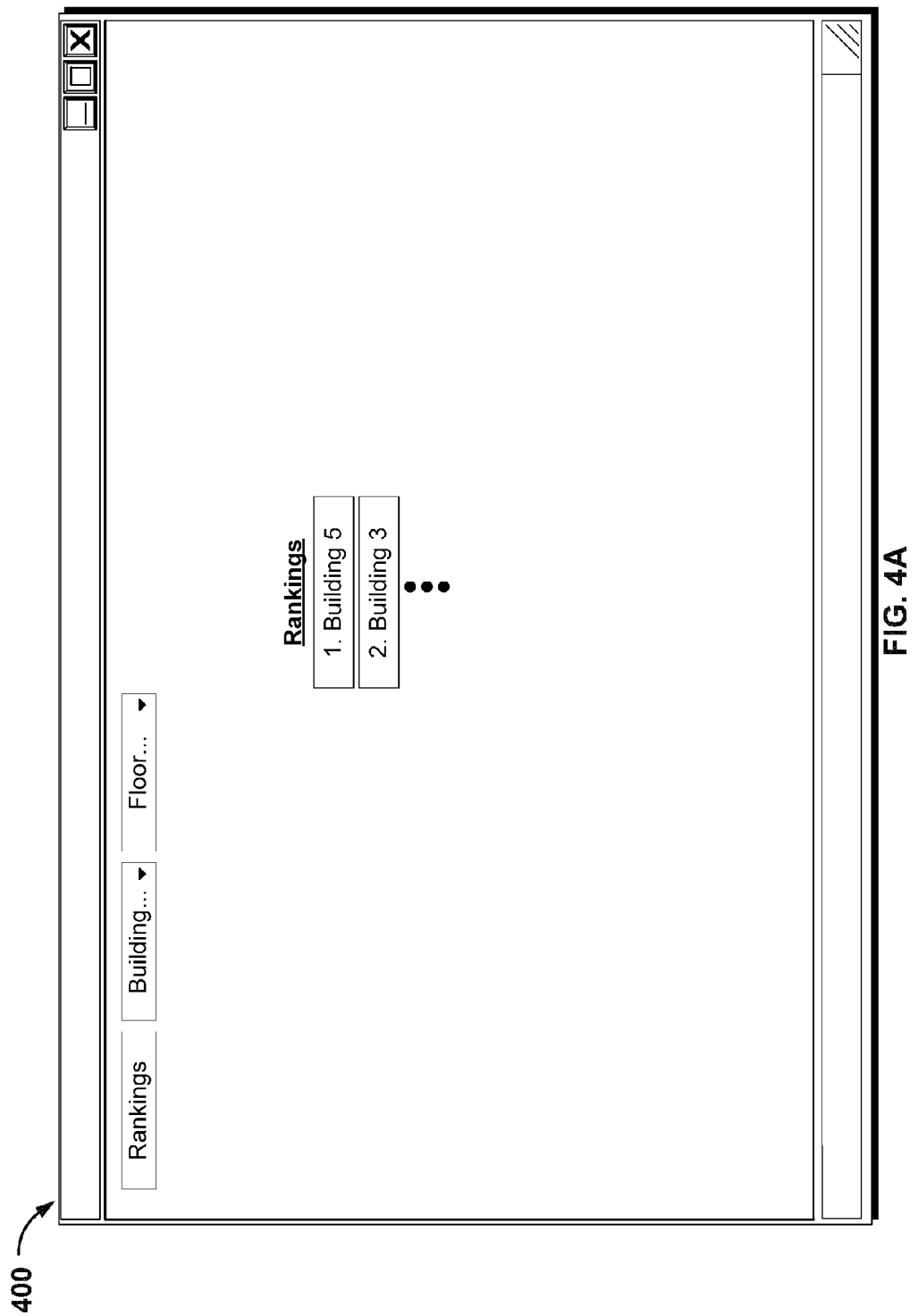
FIG. 4A illustrates a graphical user interface (GUI) that may be generated by a display.

The ranking representation may allow for detailed insight into the performance of individual buildings via a set of menus that open hierarchically. FIG. 4A illustrates a graphical user interface (GUI) 400 that may be generated by the display 320. As illustrated in FIG. 4A, the GUI 400 may display the rankings of a group of buildings. Each of the ranked buildings may be selected to view additional information.

Figure 4B:
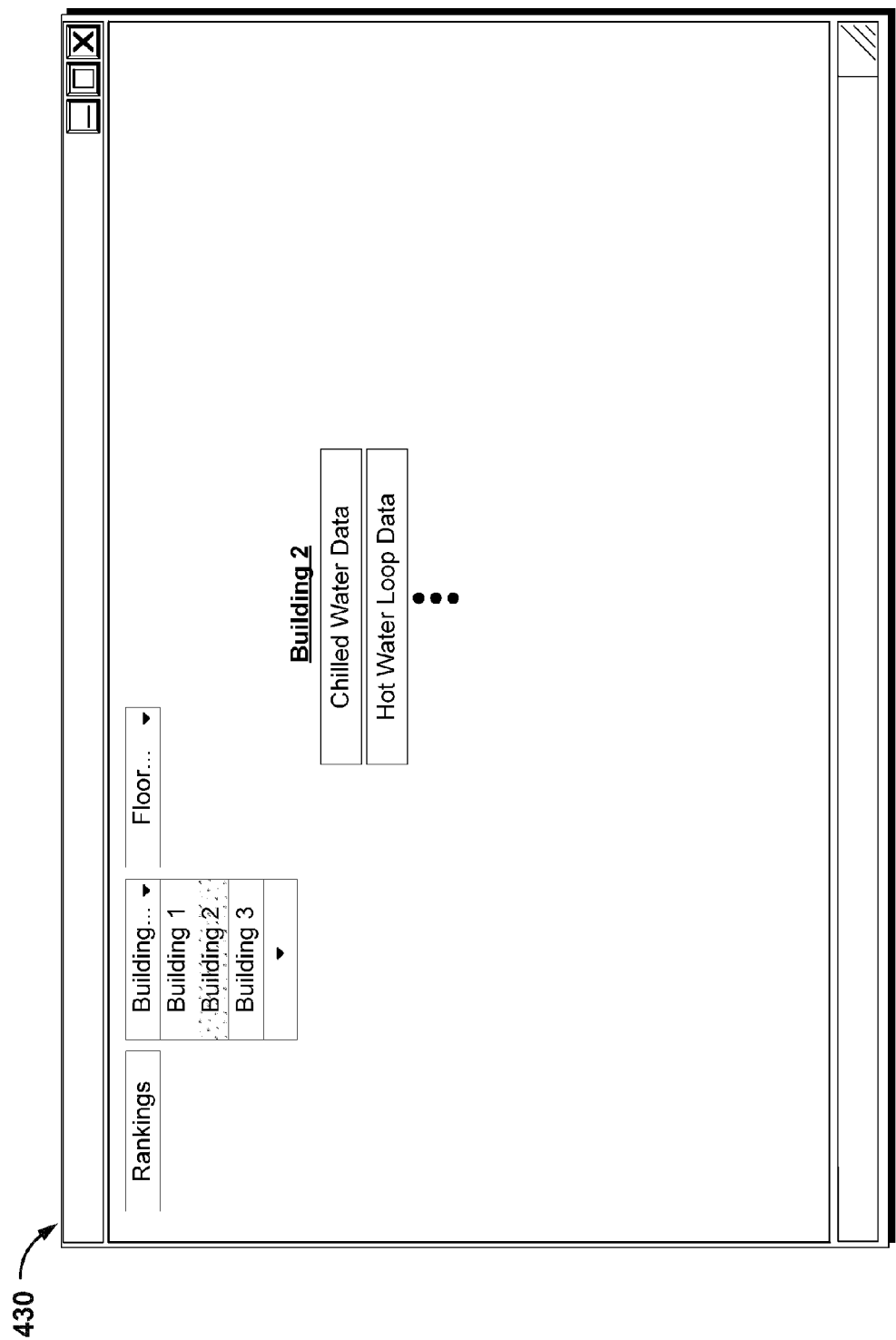
FIG. 4B illustrates another graphical user interface (GUI) that may be generated by a display.

FIG. 4B illustrates another GUI 430 that may be generated by the display 320. As illustrated in FIG. 4B, the GUI 430 includes a representation of metered data at a whole building level for the building selected by the user (e.g., building 2), including the chilled water and hot water loop. Each of the metered data displayed in GUI 430 may be selected to provide additional information.

Figure 4C:
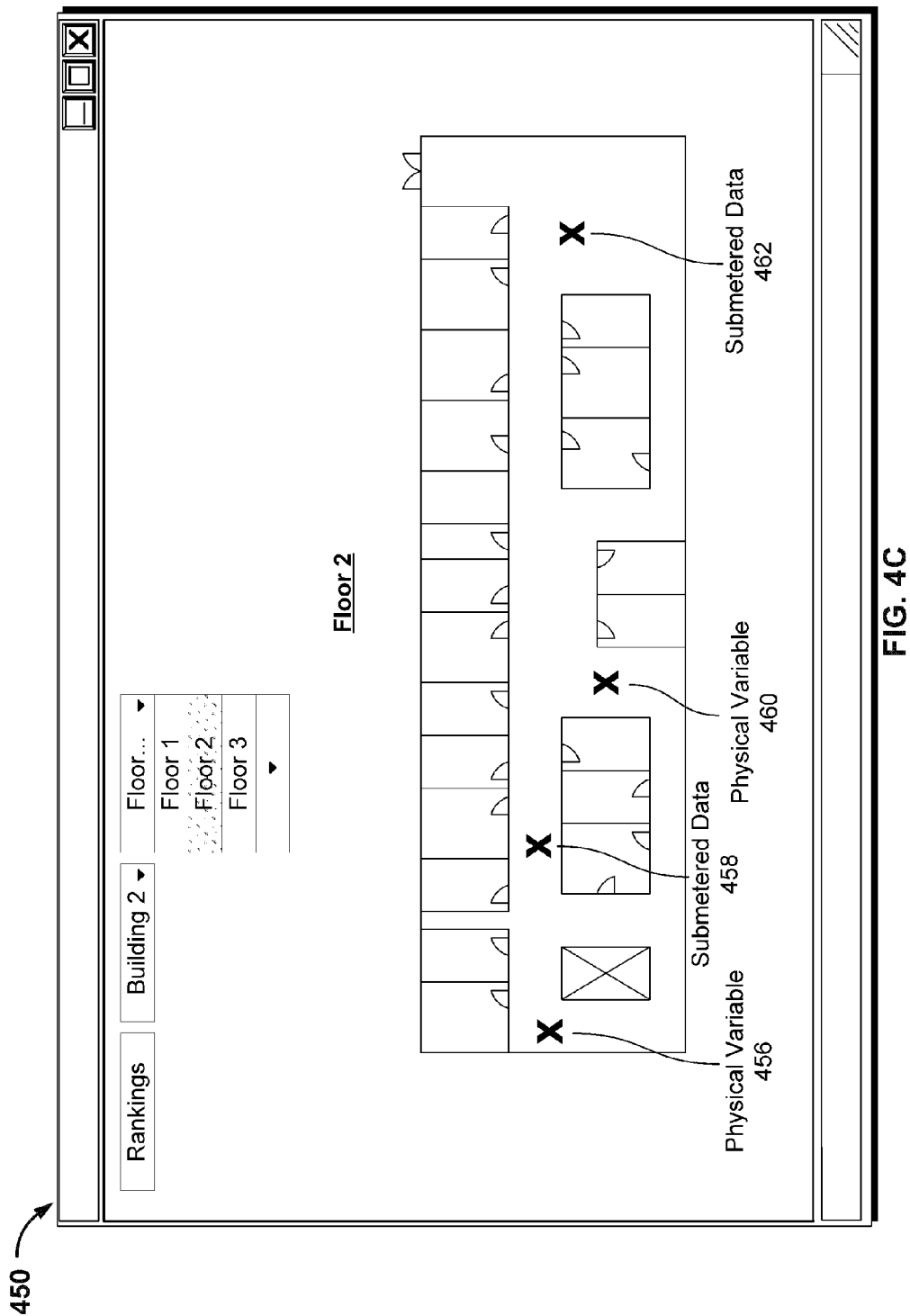
FIG. 4C illustrates another graphical user interface (GUI) that may be generated by a display.

FIG. 4C illustrates another GUI 450 that may be generated by the display 320. As illustrated in FIG. 4C, the GUI 450 includes a representation of submetered data 458 and 462 and physical variables 456 and 460 plotted on individual floors of a selected building. As illustrated in FIG. 4C, the submetered data 458 and 462 and/or the physical variables 456 and 460 may be plotted in the location on the floor plan from which the data originates. While GUI 450 includes a single floor, this is not meant to be limiting as one or more floors may be displayed in the GUI 450. The hierarchical menus and the GUIs 400, 430, and 450 may be configured based on the requirements specified by a user.

For example, a country may require all building operators to shut down their systems at certain hours. This requirement may serve to enforce a nationwide protocol, to meet certain environmental guidelines. Thus, a property owner of 45 properties, or a government official may use this system to rank the buildings on the properties to ascertain the most and least efficient buildings, relative to one another, and make a decision on shutdown.

The ranking is not absolute, but each building's individual metrics may be normalized based upon the second dataset. Thus, even though a first building may have a higher energy bill than a second building the first may not necessarily be ranked as less efficient than the second. For example, if the first building is occupied, while the second is not, the system may account for difference (by normalizing based upon occupancy) and may thereafter even determine that the first building is holistically more efficient than the second building.

Figure 5:
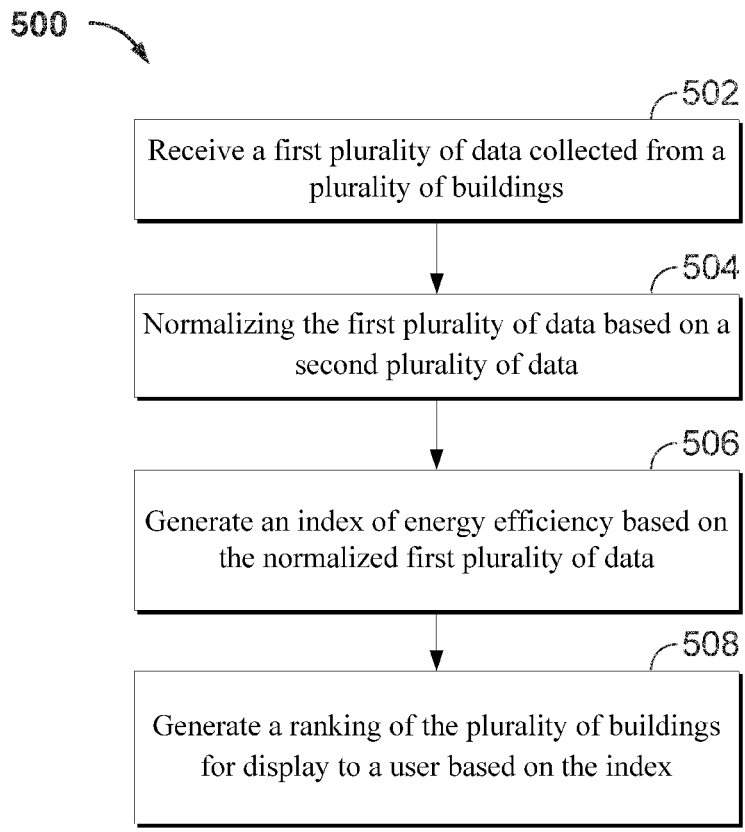
FIG. 5 illustrates a flowchart of a method for assessing the relative efficiency of a plurality of buildings.

FIG. 5 illustrates a flowchart of a method 500 for assessing the relative efficiency of a plurality of buildings. In an embodiment, the method 500 may be performed by the computing device 305. At block 502, a first plurality of data collected from a plurality of buildings is received. In an embodiment, the first plurality of data comprises energy utilization and energy supply data. At block 504, the first plurality of data is normalized based on a second plurality of data. In an embodiment, the second plurality of data comprises at least one of weather data, occupancy data, climate data, operational protocol data, utility contract data, budget data, a legal designation, and/or utility cost data. At block 506, an index of energy efficiency is generated based on the normalized first plurality of data. At block 508, a ranking of the plurality of buildings is generated for display to a user based on the index.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A method, implemented on at least one computer device, for assessing the relative efficiency of a plurality of buildings, comprising:
    receiving a first plurality of data collected from a first building in the plurality of buildings, the first plurality of data comprising energy utilization and energy supply data;
    normalizing the first plurality of data based on a second plurality of data, the second plurality of data comprising at least one of weather data, occupancy data, climate data, operational protocol data, utility contract data, budget data, a legal designation, or utility cost data;
    generating a first index of energy efficiency for the first building based on the normalized first plurality of data;
    receiving values for a third plurality of data, wherein the third plurality of data comprises values of the energy utilization and energy supply data for the first building if the first building is operating optimally;
    generating a second index of energy efficiency for the first building based on the third plurality of data;
    comparing the first index and the second index;
    generating a ranking of the first building in the plurality of buildings based on the comparison of the first index and the second index; and
    generating, for display on a computing device, a user interface that includes a selectable indication of the first building and the ranking of the first building in the plurality of the buildings;
    receiving a selection of the first building in the user interface;
    in response to the selection of the first building in the user interface,
        determining locations in the first building at which data in the first plurality of data originates; and
        updating the user interface to show a floor plan of the first building with the determined locations superimposed over the floor plan.

2. The method of claim 1, wherein the plurality of buildings comprises one of real buildings or simulated buildings.

3. The method of claim 1, wherein generating a ranking of the first building in the plurality of buildings based on the comparison of the first index and the second index comprises generating the ranking of the first building in the plurality of buildings based on a difference between the first index and the second index.

4. The method of claim 1, wherein the first plurality of data further comprises a comfort assessment in the first building.

5. A system for assessing the relative efficiency of a plurality of buildings, comprising:
    an I/O module configured to receive a first plurality of data collected from a first building in the plurality of buildings, the first plurality of data comprising energy utilization and energy supply data;
    a processor configured to normalize the first plurality of data based upon a second plurality of data, the second plurality of data comprising at least one of weather data, occupancy data, climate data, operational protocol data, utility contract data, budget data, a legal designation, or utility cost data;
    an index generator module configured to generate a first index of energy efficiency for the first building based on the normalized first plurality of data, wherein the index generator module is further configured to generate a second index of energy efficiency for the first building based on a third plurality of data, wherein the third plurality of data comprises values of the energy utilization and energy supply data for the first building if the first building is operating optimally, and wherein the processor is further configured to compare the first index and the second index; and
    a display module configured to generate a ranking of the first building in the plurality of buildings based on the comparison of the first index and the second index, wherein the display module is further configured to generate a user interface that includes a selectable indication of the first building and the ranking of the first building in the plurality of buildings,
    wherein the I/O module is further configured to receive a selection of the first building in the user interface, and
    wherein, in response to the selection of the first building in the user interface, the display module is further configured to determine locations in the first building at which data in the first plurality of data originates and update the user interface to show a flow plan of the first building with the determined locations superimposed over the floor plan.

6. The system of claim 5, wherein the plurality of buildings comprises one of real buildings or simulated buildings.

7. The system of claim 5, wherein the processor is further configured to generate the ranking of the first building in the plurality of buildings based on a difference between the first index and the second index.

8. The system of claim 5, wherein the first plurality of data further comprises a comfort assessment in the first building.

\* \* \* \* \*

UNITED STATES PATENT AND TRADEMARK OFFICE
CERTIFICATE OF CORRECTION

PATENT NO. : 9,563,182 B2  
APPLICATION NO. : 13/758844  
DATED : February 7, 2017  
INVENTOR(S) : Igor Mezic et al.

Page 1 of 1

It is certified that error appears in the above-identified patent and that said Letters Patent is hereby corrected as shown below:

In the Claims

In Column 9 at Line 67, In Claim 1, after "index;" delete "and".

Signed and Sealed this  
Sixteenth Day of May, 2017

Michelle K. Lee  
*Director of the United States Patent and Trademark Office*